(12) United States Patent
Arikapudi et al.

(10) Patent No.: US 11,734,451 B1
(45) Date of Patent: Aug. 22, 2023

(54) SECURE CONTINUOUS COMPLIANCE ENFORCEMENT ON A DATA EXCHANGE SYSTEM

(71) Applicant: Snowflake Inc., Bozeman, MT (US)

(72) Inventors: Abhiram Arikapudi, Sammamish, WA (US); Brian Jack Lee, San Mateo, CA (US); Saurin Shah, Kirkland, WA (US); Cameron Tekiyeh, San Francisco, CA (US); Sujay C. Yantrapragada, San Jose, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 17/931,424

(22) Filed: Sep. 12, 2022

(51) Int. Cl.
 *G06F 21/00* (2013.01)
 *G06F 21/62* (2013.01)
 *G06F 16/242* (2019.01)
(52) U.S. Cl.
 CPC ...... *G06F 21/6254* (2013.01); *G06F 16/2445* (2019.01)
(58) Field of Classification Search
 CPC .................. G06F 21/6254; G06F 16/2445
 See application file for complete search history.

(56) References Cited

U.S. PATENT DOCUMENTS

| | | | |
|---|---|---|---|
| 11,023,842 B2* | 6/2021 | Beaumont | G06F 15/76 |
| 2019/0384933 A1* | 12/2019 | Lebel | G06Q 20/4097 |
| 2022/0198562 A1* | 6/2022 | Cella | G06Q 40/04 |

\* cited by examiner

*Primary Examiner* — Ghazal B Shehni
(74) *Attorney, Agent, or Firm* — Schwegman Lundberg & Woessner, P.A.

(57) ABSTRACT

An exchange template framework for a data platform. A data provider of the data platform instructs the data platform to generate an exchange template based on compliance rules. In response to determining by the data platform to initiate a compliance report, the data platform maps evidence items for the compliance report from one or more source tables using a data field mapper of the exchange template. The data platform generates compliance program specific views based on the evidence items mapped from the source tables and generates an anonymized view based on the compliance program specific views using an anonymization layer of the exchange template. The data platform provides the anonymized view to an assessor using one or more validation scripts of the exchange template.

20 Claims, 6 Drawing Sheets

SECURE CONTINUOUS COMPLIANCE ENFORCEMENT ON A DATA EXCHANGE SYSTEM

TECHNICAL FIELD

Examples of the disclosure relate generally to databases and, more specifically, to security of shared applications.

BACKGROUND

Data platforms are widely used for data storage and data access in computing and communication contexts. With respect to architecture, a data platform could be an on-premises data platform, a network-based data platform (e.g., a cloud-based data platform), a combination of the two, and/or include another type of architecture. With respect to type of data processing, a data platform could implement online transactional processing (OLTP), online analytical processing (OLAP), a combination of the two, and/or another type of data processing. Moreover, a data platform could be or include a relational database management system (RDBMS) and/or one or more other types of database management systems.

BRIEF DESCRIPTION OF THE DRAWINGS

The present disclosure will be understood more fully from the detailed description given below and from the accompanying drawings of various examples of the disclosure.

DETAILED DESCRIPTION

Figure 1:
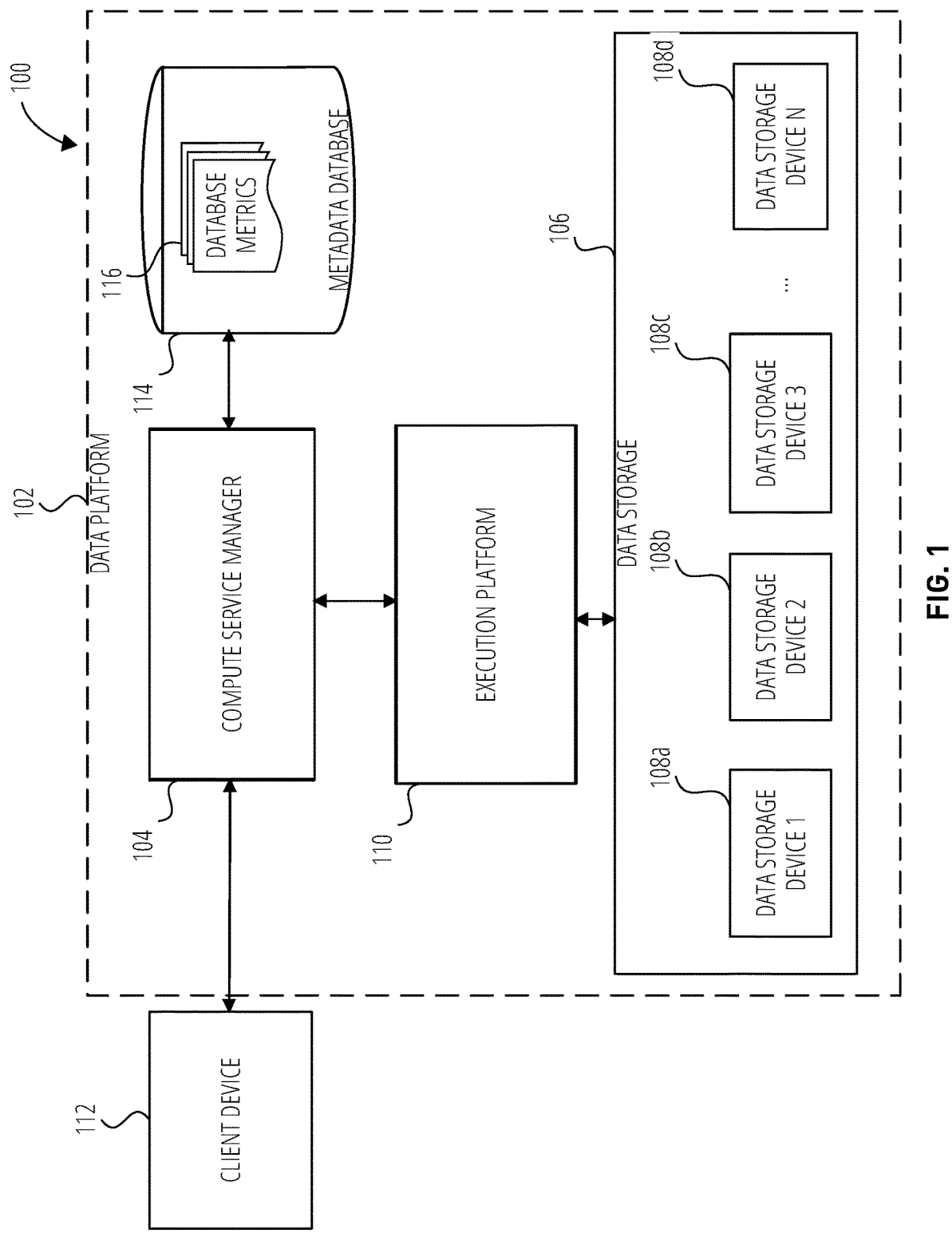
FIG. 1 illustrates an example computing environment that includes a network-based data platform in communication with a cloud storage provider system, in accordance with some examples of the present disclosure.

Customers of data platforms desire a way to share data use metrics and anonymous data with compliance auditors or assessors. For example, many organizations use and maintain large amounts of data as they conduct their operations. Some organizations are subject to regulations that require audits of these data to ensure compliance with the regulations. In some scenarios, an independent assessor may spend multiple weeks requesting, obtaining, reviewing and validating control operation evidence. In turn, an organization may spend multiple weeks gathering and extracting the evidence, sanitizing this information and sharing it securely with the assessor. Therefore, a need exists for methodologies that allow the collection and presentation of compliance data.

In some examples, users of a data platform manage and monitor their operational effectiveness metrics applicable to specific compliance standards, such as ISO 27001 for data security or System and Organization Controls (SOC) 2 Type2 for accounting. In addition, users securely share (via customized anonymized views) these metrics and statistics with assessors on a real-time basis, enabling continuous compliance monitoring for assessors. To achieve this, an exchange template framework is provided to data providers and data consumers of the data platform. The exchange template framework includes exchange templates that define what metrics are determined and what data is shared. These exchange templates are used in manual and automated processes to provide on-demand access by assessors.

In some examples, a data platform uses the exchange templates to provide secure sharing of unstructured data and other evidentiary items with assessors and other applicable third parties.

In some examples, the use of exchange templates reduces lead-times for audits performed by assessors as the providers of the exchange templates no longer need to extract, secure and share the data with assessors. In another aspect, assessors are able to perform continuous monitoring of metrics, as opposed to having visibility only once or twice a year. In another aspect, assessment processes are less expensive as sampling and manual testing requirements are reduced. In another aspect, security of the shared data and metrics is enhanced through the automation of anonymizing processes ensuring that these processes are consistently applied.

In some examples, a data platform uses exchange templates to automatically map evidence items from the provider's source tables to create compliance program specific views based on data in the source tables, apply bespoke anonymization logic on the view, and make this view available to an assessor. The exchange template ensures the enforcement of best practice queries to execute and source all evidence information needed while the assessor is able to monitor these metrics at any time. The provider also benefits in that the exchange templates may be set this up only once, leveraging the exchange template as often as needed. In addition, a provider of the data platform may publish exchange templates for any data platform customer who uses the data platform to hold their logging and operational data can use such an exchange template to run their own compliance programs.

In some examples, a data provider of a data platform instructs the data platform to generate an exchange template based on compliance rules. In response to determining by the data platform to initiate a compliance report, the data platform maps evidence items for the compliance report from one or more source tables using a data field mapper of the exchange template. The data platform generates compliance program specific views based on the evidence items mapped from the source tables and generates an anonymized view based on the compliance program specific views using an anonymization layer of the exchange template. The data platform provides the anonymized view to an assessor using validation scripts of the exchange template.

In some examples, the data platform determines to initiate the compliance report in response to receiving a request for the compliance report from the assessor.

In some examples, data platform determines to initiate the compliance report based on a predetermined schedule.

In some examples, the data platform performs a logical mapping between the one or more source tables and abstracted views based on data fields relevant to a specified compliance program.

In some examples, the data platform generates the anonymized view based on one or more anonymization rules applied to the compliance program specific view by the anonymization layer.

In some examples, the data platform stores the anonymized view in a shared database of the data platform.

In some examples, a validation script is a pre-built script specific to the compliance program being assessed.

Reference will now be made in detail to specific examples for carrying out the inventive subject matter. Examples of these specific examples are illustrated in the accompanying drawings, and specific details are set forth in the following description in order to provide a thorough understanding of the subject matter. It will be understood that these examples are not intended to limit the scope of the claims to the illustrated examples. On the contrary, they are intended to cover such alternatives, modifications, and equivalents as may be included within the scope of the disclosure.

FIG. 1 illustrates an example computing environment 100 that includes a data platform 102 in communication with a client device 112, in accordance with some examples of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein.

As shown, the data platform 102 comprises a data storage 106, a compute service manager 104, an execution platform 110, and a metadata database 114. The data storage 106 comprises a plurality of computing machines and provides on-demand computer system resources such as data storage and computing power to the data platform 102. As shown, the data storage 106 comprises multiple data storage devices, such as data storage device 1 108a, data storage device 2 108b, data storage device 3 108c, and data storage device N 108d. In some examples, the data storage devices 1 to N are cloud-based storage devices located in one or more geographic locations. For example, the data storage devices 1 to N may be part of a public cloud infrastructure or a private cloud infrastructure. The data storage devices 1 to N may be hard disk drives (HDDs), solid state drives (SSDs), storage clusters, Amazon S3TM storage systems or any other data storage technology. Additionally, the data storage 106 may include distributed file systems (e.g., Hadoop Distributed File Systems (HDFS)), object storage systems, and the like.

The data platform 102 is used for reporting and analysis of integrated data from one or more disparate sources including the storage devices 1 to N within the data storage 106. The data platform 102 hosts and provides data reporting and analysis services to multiple consumer accounts. Administrative users can create and manage identities (e.g., users, roles, and groups) and use privileges to allow or deny access to identities to resources and services. Generally, the data platform 102 maintains numerous consumer accounts for numerous respective consumers. The data platform 102 maintains each consumer account in one or more storage devices of the data storage 106. Moreover, the data platform 102 may maintain metadata associated with the consumer accounts in the metadata database 114. Each consumer account includes multiple data objects with examples including users, roles, privileges, a datastores or other data locations (herein termed a "stage" or "stages"), and the like.

The compute service manager 104 coordinates and manages operations of the data platform 102. The compute service manager 104 also performs query optimization and compilation as well as managing clusters of compute services that provide compute resources (also referred to as "virtual warehouses"). The compute service manager 104 can support any number and type of clients such as end users providing data storage and retrieval requests, system administrators managing the systems and methods described herein, and other components/devices that interact with compute service manager 104. As an example, the compute service manager 104 is in communication with the client device 112. The client device 112 can be used by a user of one of the multiple consumer accounts supported by the data platform 102 to interact with and utilize the functionality of the data platform 102. In some examples, the compute service manager 104 does not receive any direct communications from the client device 112 and only receives communications concerning jobs from a queue within the data platform 102.

The compute service manager 104 is also coupled to metadata database 114. The metadata database 114 stores data pertaining to various functions and aspects associated with the data platform 102 and its users. In some examples, the metadata database 114 includes a summary of data stored in remote data storage systems as well as data available from a local cache. In some examples, the metadata database 114 may include information regarding how data is organized in remote data storage systems (e.g., the database storage 106) and the local caches. In some examples, the metadata database 114 include data of metrics describing usage and access by providers and consumers of the data stored on the data platform 102. In some examples, the metadata database 114 allows systems and services to determine whether a piece of data needs to be accessed without loading or accessing the actual data from a storage device.

The compute service manager 104 is further coupled to the execution platform 110, which provides multiple computing resources that execute various data storage and data retrieval tasks. The execution platform 110 is coupled to the database storage 106. The execution platform 110 comprises a plurality of compute nodes. A set of processes on a compute node executes a query plan compiled by the compute service manager 104. The set of processes can include: a first process to execute the query plan; a second process to monitor and delete micro-partition files using a least recently used (LRU) policy and implement an out of memory (OOM) error mitigation process; a third process that extracts health information from process logs and status to send back to the compute service manager 104; a fourth process to establish communication with the compute service manager 104 after a system boot; and a fifth process to handle all communication with a compute cluster for a given job provided by the compute service manager 104 and to communicate information back to the compute service manager 104 and other compute nodes of the execution platform 110.

In some examples, communication links between elements of the computing environment 100 are implemented via one or more data communication networks. These data communication networks may utilize any communication protocol and any type of communication medium. In some examples, the data communication networks are a combination of two or more data communication networks (or sub-networks) coupled to one another. In alternate examples, these communication links are implemented using any type of communication medium and any communication protocol.

As shown in FIG. 1, the data storage devices data storage device 1 108a to data storage device N 108d are decoupled from the computing resources associated with the execution platform 110. This architecture supports dynamic changes to the data platform 102 based on the changing data storage/retrieval needs as well as the changing needs of the users and systems. The support of dynamic changes allows the data platform 102 to scale quickly in response to changing demands on the systems and components within the data platform 102. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

The compute service manager 104, metadata database 114, execution platform 110, and data storage 106 are shown in FIG. 1 as individual discrete components. However, each of the compute service manager 104, metadata database 114, execution platform 110, and data storage 106 may be implemented as a distributed system (e.g., distributed across multiple systems/platforms at multiple geographic locations). Additionally, each of the compute service manager 104, metadata database 114, execution platform 110, and data storage 106 can be scaled up or down (independently of one another) depending on changes to the requests received and the changing needs of the data platform 102. Thus, in the described examples, the data platform 102 is dynamic and supports regular changes to meet the current data processing needs.

During operation, the data platform 102 processes multiple jobs determined by the compute service manager 104. These jobs are scheduled and managed by the compute service manager 104 to determine when and how to execute the job. For example, the compute service manager 104 may divide the job into multiple discrete tasks and may determine what data is needed to execute each of the multiple discrete tasks. The compute service manager 104 may assign each of the multiple discrete tasks to one or more nodes of the execution platform 110 to process the task. The compute service manager 104 may determine what data is needed to process a task and further determine which nodes within the execution platform 110 are best suited to process the task. Some nodes may have already cached the data needed to process the task and, therefore, be a good candidate for processing the task. Metadata stored in the metadata database 114 assists the compute service manager 104 in determining which nodes in the execution platform 110 have already cached at least a portion of the data needed to process the task. One or more nodes in the execution platform 110 process the task using data cached by the nodes and, if necessary, data retrieved from the data storage 106. It is desirable to retrieve as much data as possible from caches within the execution platform 110 because the retrieval speed is typically faster than retrieving data from the data storage 106.

As shown in FIG. 1, the computing environment 100 separates the execution platform 110 from the data storage 106. In this arrangement, the processing resources and cache resources in the execution platform 110 operate independently of the database storage devices data storage device 1 108a to data storage device N 108d in the data storage 106. Thus, the computing resources and cache resources are not restricted to a specific one of the data storage device 1 108a to data storage device N 108d. Instead, all computing resources and all cache resources may retrieve data from, and store data to, any of the data storage resources in the data storage 106.

Figure 2:
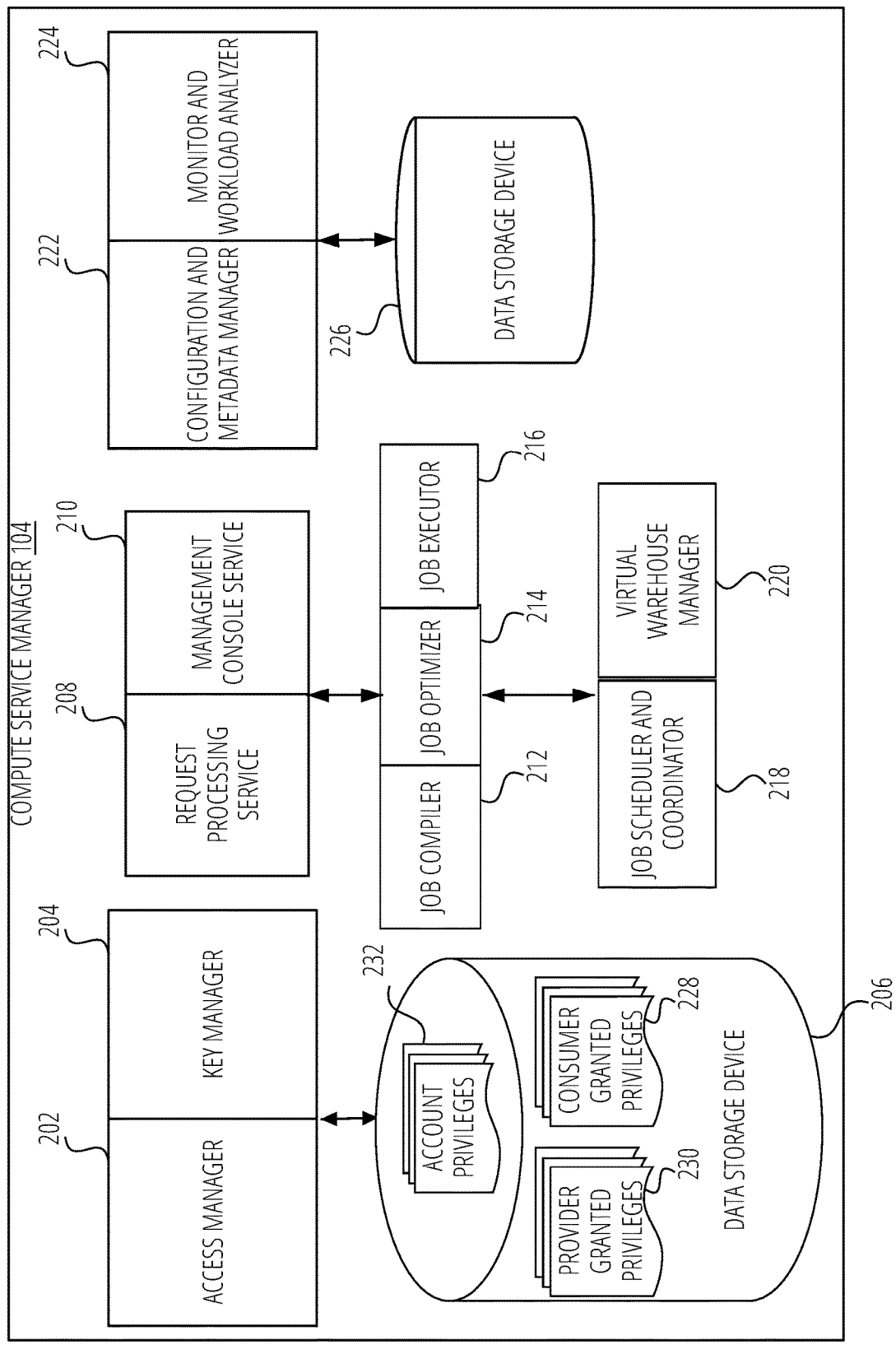
FIG. 2 is a block diagram illustrating components of a compute service manager, in accordance with some examples of the present disclosure.

FIG. 2 is a block diagram illustrating components of the compute service manager 104, in accordance with some examples of the present disclosure. As shown in FIG. 2, the compute service manager 104 includes an access manager 202 and a key manager 204 coupled to a data storage device 206. Access manager 202 handles authentication and authorization tasks for the systems described herein. Key manager 204 manages storage and authentication of keys used during authentication and authorization tasks. For example, access manager 202 and key manager 204 manage the keys used to access data stored in remote storage devices (e.g., data storage devices in data storage 106). As used herein, the remote storage devices may also be referred to as "persistent storage devices" or "shared storage devices."

In some examples, the access manager 202 authorizes access to database objects of the data platform 102 based on one or more sets of access privileges stored on the data storage device 206, such as a set of account privileges 232, a set of provider granted privileges 230, and a set of consumer granted privileges 228.

A request processing service 208 manages received data storage requests and data retrieval requests (e.g., jobs to be performed on database data). For example, the request processing service 208 may determine the data necessary to process a received query (e.g., a data storage request or data retrieval request). The data may be stored in a cache within the execution platform 110 or in a data storage device in data storage 106.

A management console service 210 supports access to various systems and processes by administrators and other system managers. Additionally, the management console service 210 may receive a request to execute a job and monitor the workload on the system.

The compute service manager 104 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 104.

A job scheduler and coordinator 218 sends received jobs to the appropriate services or systems for compilation, optimization, and dispatch to the execution platform 110. For example, jobs may be prioritized and processed in that prioritized order. In some examples, the job scheduler and coordinator 218 determines a priority for internal jobs that are scheduled by the compute service manager 104 with other "outside" jobs such as user queries that may be scheduled by other systems in the database but may utilize the same processing resources in the execution platform 110. In some examples, the job scheduler and coordinator 218 identifies or assigns particular nodes in the execution platform 110 to process particular tasks. A virtual warehouse manager 220 manages the operation of multiple virtual warehouses implemented in the execution platform 110. As discussed below, each virtual warehouse includes multiple execution nodes that each include a cache and a processor.

Additionally, the compute service manager 104 includes a configuration and metadata manager 222, which manages the information related to the data stored in the remote data storage devices and in the local caches (e.g., the caches in execution platform 110). The configuration and metadata manager 222 uses the metadata to determine which data micro-partitions need to be accessed to retrieve data for processing a particular task or job. A monitor and workload analyzer 224 oversees processes performed by the compute service manager 104 and manages the distribution of tasks (e.g., workload) across the virtual warehouses and execution nodes in the execution platform 110. The monitor and workload analyzer 224 also redistributes tasks, as needed, based on changing workloads throughout the data platform 102 and may further redistribute tasks based on a user (e.g., "external") query workload that may also be processed by the execution platform 110. The configuration and metadata manager 222 and the monitor and workload analyzer 224 are coupled to a data storage device 226. Data storage device 226 in FIG. 2 represents any data storage device within the data platform 102. For example, data storage device 226 may represent caches in execution platform 110, storage devices in data storage 106, or any other storage device.

The compute service manager 104 validates all communication from an execution platform (e.g., the execution platform 110) to validate that the content and context of that communication are consistent with the task(s) known to be assigned to the execution platform. For example, an instance of the execution platform executing a query A should not be allowed to request access to data-source D (e.g., data storage device 226) that is not relevant to query A. Similarly, a given execution node (e.g., execution node 1 304a) may need to communicate with another execution node (e.g., execution node 2 304b), and should be disallowed from communicating with a third execution node (e.g., execution node 1 316a) and any such illicit communication can be recorded (e.g., in a log or other location). Also, the information stored on a given execution node is restricted to data relevant to the current query and any other data is unusable, rendered so by destruction or encryption where the key is unavailable.

Figure 3:
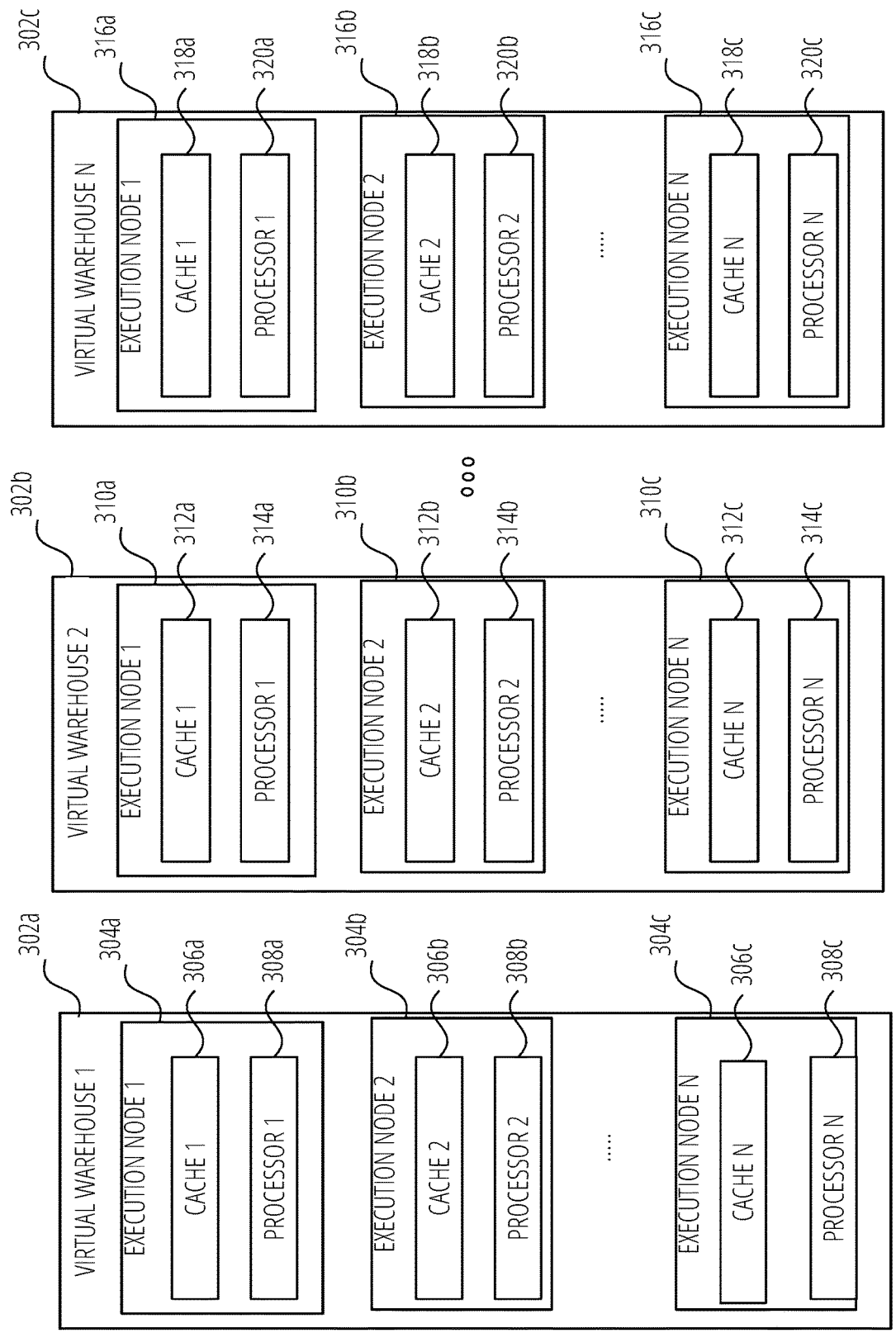
FIG. 3 is a block diagram illustrating components of an execution platform, in accordance with some examples of the present disclosure.

FIG. 3 is a block diagram illustrating components of the execution platform 110, in accordance with some examples of the present disclosure. As shown in FIG. 3, the execution platform 110 includes multiple virtual warehouses, including virtual warehouse 1 302a, and virtual warehouse 2 302b to virtual warehouse N 302c. Each virtual warehouse includes multiple execution nodes that each includes a data cache and a processor. The virtual warehouses can execute multiple tasks in parallel by using the multiple execution nodes. As discussed herein, the execution platform 110 can add new virtual warehouses and drop existing virtual warehouses in real time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in data storage 106).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 1 to N shown in FIG. 1. Thus, the virtual warehouses are not necessarily assigned to a specific data storage device 1 to N and, instead, can access data from any of the data storage devices 1 to N within the data storage 106. Similarly, each of the execution nodes shown in FIG. 3 can access data from any of the data storage devices 1 to N. In some examples, a particular virtual warehouse or a particular execution node may be temporarily assigned to a specific data storage device, but the virtual warehouse or execution node may later access data from any other data storage device.

In the example of FIG. 3, virtual warehouse 1 302a includes a plurality of execution nodes as exemplified by execution node 1 304a, execution node 2 304b, and execution node N 304c. Execution node 1 304a includes cache 1 306a and a processor 1 308a. Execution node 2 304b includes cache 2 306b and processor 2 308b. Execution node N 304c includes cache N 306c and processor N 308c. Each execution node 1 to N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 302a discussed above, virtual warehouse 2 302b includes a plurality of execution nodes as exemplified by execution node 1 310a, execution node 2 310b, and execution node N 310c. Execution node 1 304a includes cache 1 312a and processor 1 314a. Execution node 2 310b includes cache 2 312b and processor 2 314b. Execution node N 310c includes cache N 312c and processor N 314c. Additionally, virtual warehouse N 302c includes a plurality of execution nodes as exemplified by execution node 1 316a, execution node 2 316ib, and execution node N 316c. Execution node 1 316a includes cache 1 318a and processor 1 320a. Execution node 2 316b includes cache 2 318b and processor 2 320b. Execution node N 316c includes cache N 318c and processor N 320c.

In some examples, the execution nodes shown in FIG. 3 are stateless with respect to the data the execution nodes are caching. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternate examples may include execution nodes containing any number of processors and any number of caches. Additionally, the caches may vary in size among the different execution nodes. The caches shown in FIG. 3 store, in the local execution node, data that was retrieved from one or more data storage devices in data storage 106. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some examples, the caches are implemented using high-speed memory devices that provide fast access to the cached data. Each cache can store data from any of the storage devices in the data storage 106.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some examples, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and N are associated with the same execution platform 110, the virtual warehouses may be implemented using multiple computing systems at multiple geographic locations. For example, virtual warehouse 1 can be implemented by a computing system at a first geographic location, while virtual warehouses 2 and N are implemented by another computing system at a second geographic location. In some examples, these different computing systems are cloud-based computing systems maintained by one or more different entities.

Additionally, each virtual warehouse as shown in FIG. 3 has multiple execution nodes. The multiple execution nodes associated with each virtual warehouse may be implemented using multiple computing systems at multiple geographic locations. For example, an instance of virtual warehouse 1 302*a* implements execution node 1 304*a* and execution node 2 304*b* on one computing platform at a geographic location and implements execution node N 304*c* at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some examples, the virtual warehouses may operate on the same data in data storage 106, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4A:
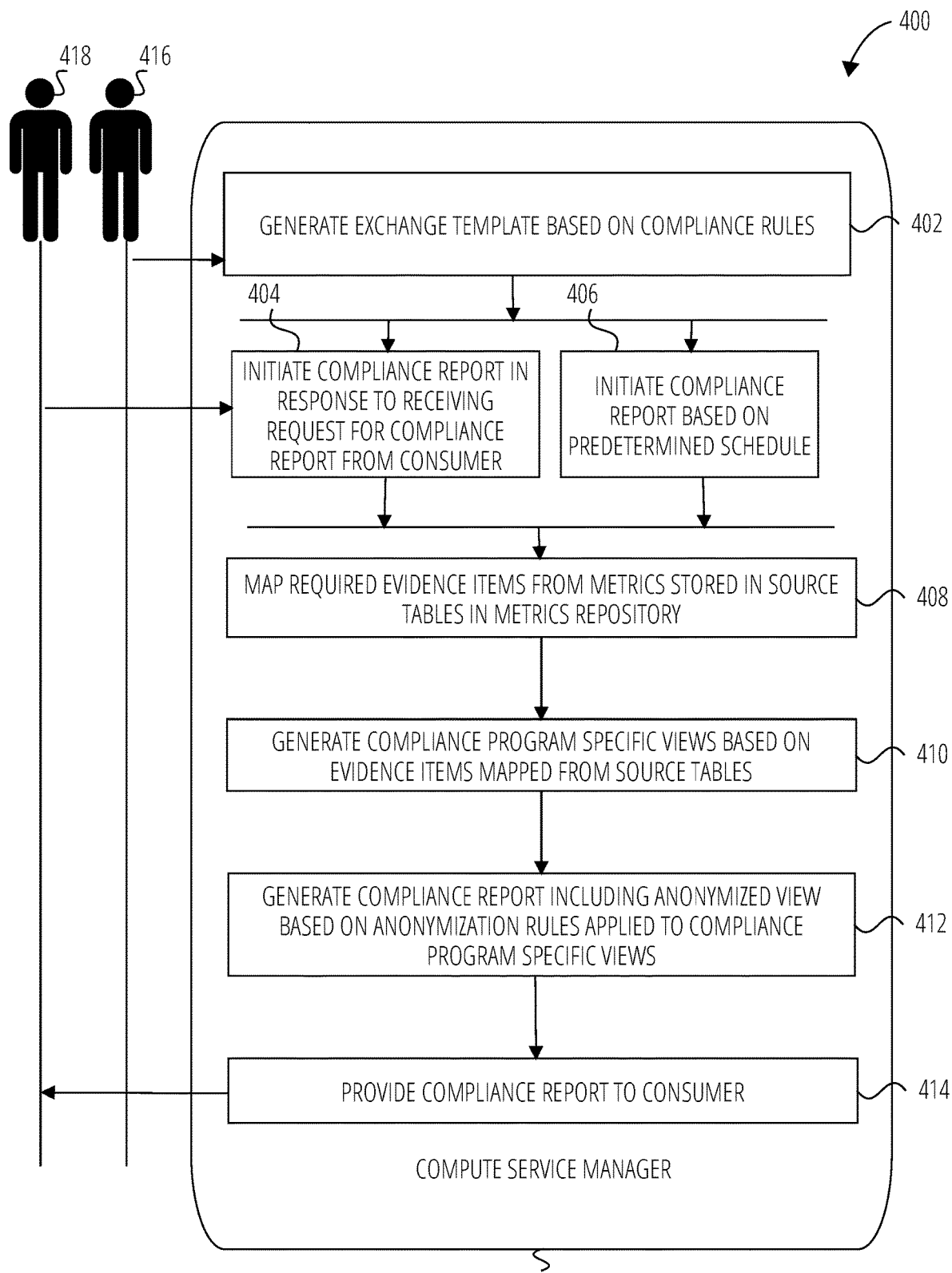
FIG. 4A is a process flow diagram illustrating a compliance report generation method of a data platform in accordance with some examples of the present disclosure.
Figure 4B:
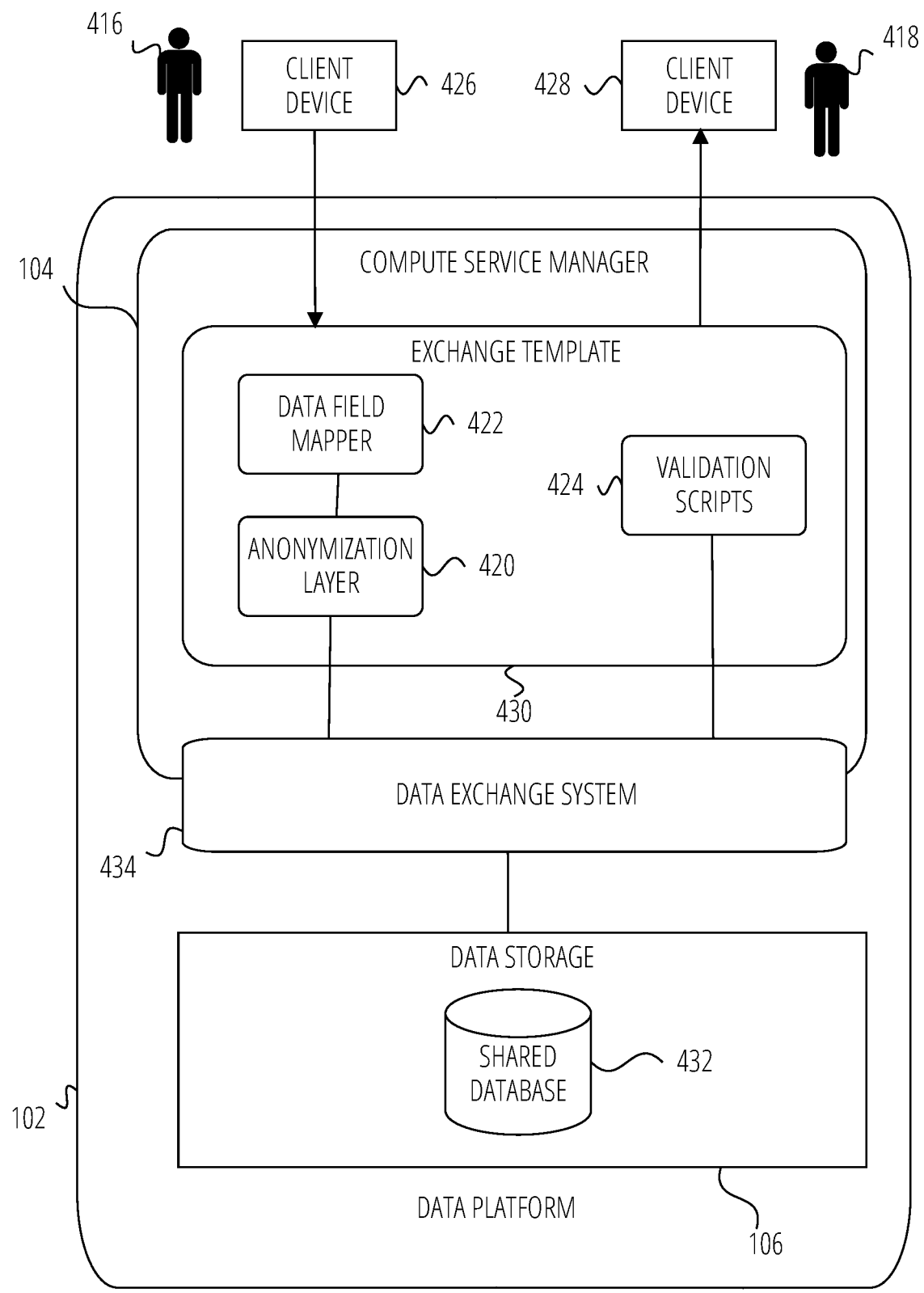
FIG. 4B is a diagram of components of a computing environment used during a compliance report generation method in accordance with some examples of the present disclosure.

FIG. 4A is a process flow diagram illustrating a compliance report generation method 400 of a data platform 102, and FIG. 4B is a diagram of components of a computing environment 100 used during the compliance report generation method 400 in accordance with some examples. A compute service manager 104 of the data platform 102 uses the compliance report generation method 400 when providing a secure continuous compliance enforcement service on a data exchange system for a provider 416. In some examples, the provider is an entity that is an auditee being audited for compliance.

In operation 402, the compute service manager 104 generates an exchange template 430 based on compliance rules in response to instructions received from a provider 416 using a client device 426. The compliance rules specify what data fields of database metrics 116 (of FIG. 1) are to be shared with a consumer 418. In some examples, the consumer 418 is an assessor tasked with assessing compliance of the provider 416 with a specific compliance program. In some examples, the consumer is a regulator, a customer of the provider, or the like.

In some examples, in operation 404, the compute service manager 104 receives request for a compliance report from the consumer 418 using a client device 428. The compute service manager 104 initiates execution of the exchange template 430 in response to the request. In some examples, in operation 406 a job scheduler and coordinator 218 (of FIG. 2) detects an occurrence of a scheduled event of a predetermined schedule set by the provider 416 using the client device 426 and determines to initiate execution of the exchange template 430 based on the occurrence of the scheduled event.

In operation 408, the compute service manager 104 executes the exchange template and automatically maps evidence items from database metrics 116 (of FIG. 1) stored in one or more source tables in a metrics repository using a data field mapper 422. For example, the data field mapper 422 performs a logical mapping between one or more source tables (such as user tables, change logs, and the like) and abstracted views that pull data fields that are relevant to a specified compliance program.

In operation 410, the compute service manager 104 creates one or more compliance program specific views based on data in the one or more source tables.

In operation 412, the compute service manager 104 generates an anonymized view of the compliance program specific view based on one or more anonymization rules applied to the compliance program specific view using an anonymization layer 420. In some examples, for data fields that are relevant to a specific compliance program, anonymization layer 420 executes compliance program specific anonymization logic that obfuscates specified details (such as a user's account ID) that are not relevant an assessor while still allowing the assessor access to the complete population of control occurrences.

The anonymized view is provided to a data exchange system 434. The data exchange system 434 stores the anonymized view in a shared database 432 of a data storage 106 of the data platform 102.

In operation 414, the compute service manager 104 provides the anonymized view to consumer 418 by extracting the anonymized view from the data exchange system 434 using one or more validation scripts 424. In some examples, a validation script is a pre-built script included in the exchange template 430 that is specific to the compliance program being assessed. The validation script includes best practice queries executed by the data platform 102 that source evidence data for the specified compliance program. For instance, a SOC2 exchange template includes pre-built queries to gather necessary validation information for each control within a SOC2 framework. The consumer 418 accesses the anonymized view of the compliance data using a client device 428 connected to the data platform 102. The data platform 102 validates the consumer 418 using a security policy specified by the provider 416. This ensures that the compliance data stored in the shared database 432 is secured against unauthorized access.

Figure 5:
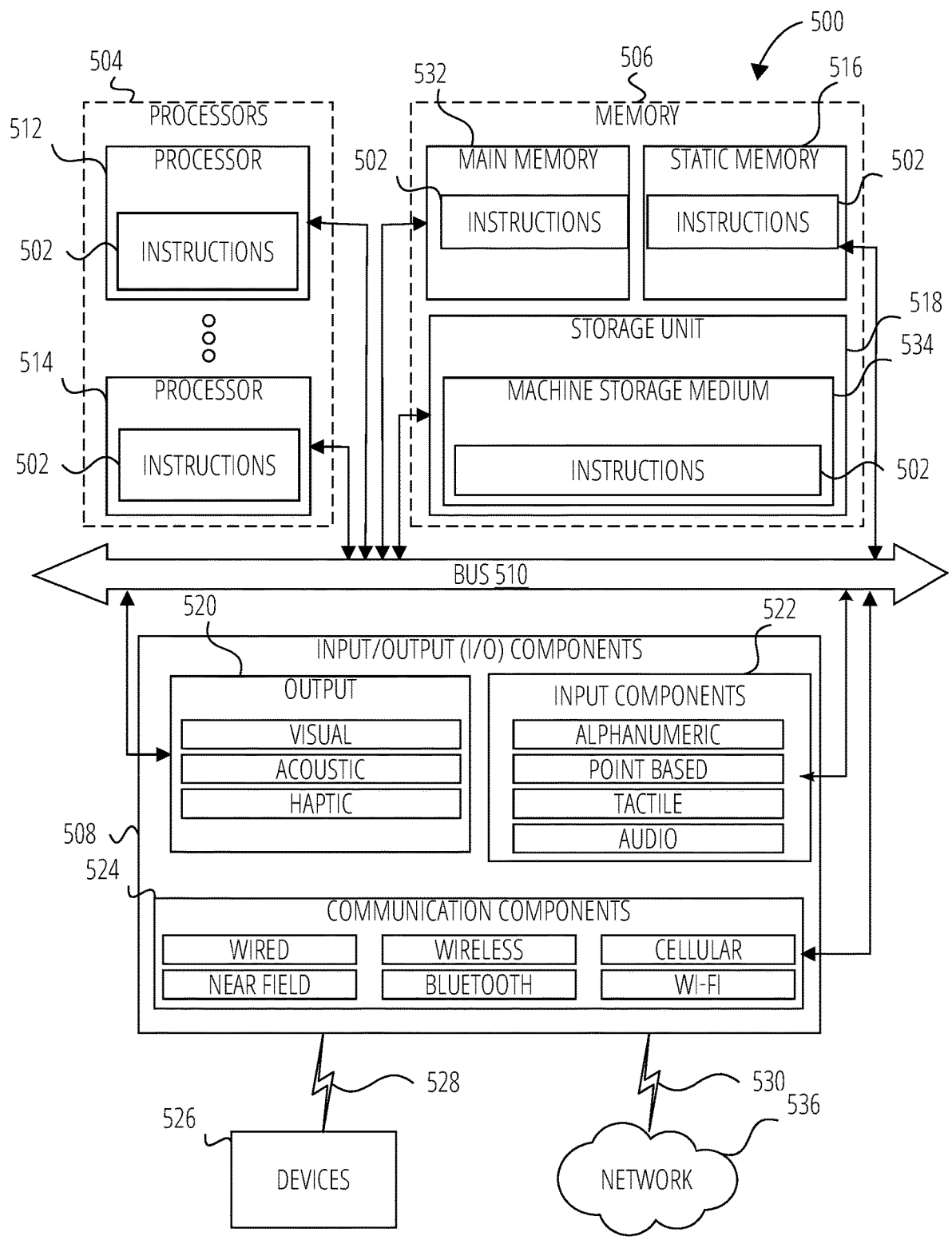
FIG. 5 illustrates a diagrammatic representation of a machine in the form of a computer system within which a set of instructions may be executed for causing the machine to perform any one or more of the methodologies discussed herein, in accordance with some examples of the present disclosure.

FIG. 5 illustrates a diagrammatic representation of a machine 500 in the form of a computer system within which a set of instructions may be executed for causing the machine 500 to perform any one or more of the methodologies discussed herein, according to examples. Specifically, FIG. 5 shows a diagrammatic representation of the machine 500 in the example form of a computer system, within which instructions 502 (e.g., software, a program, an application, an applet, an data application, or other executable code) for causing the machine 500 to perform any one or more of the methodologies discussed herein may be executed. For example, the instructions 502 may cause the machine 500 to execute any one or more operations of any one or more of the methods described herein. In this way, the instructions 502 transform a general, non-programmed machine into a particular machine 500 (e.g., the compute service manager 104, the execution platform 110, and the data storage devices 1 to N of data storage 106) that is specially configured to carry out any one of the described and illustrated functions in the manner described herein.

In alternative examples, the machine 500 operates as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 502, sequentially or otherwise, that specify actions to be taken by the machine 500. Further, while only a single machine 500 is illustrated, the term "machine" shall also be taken to include a collection of machines that individually or jointly execute the instructions 502 to perform any one or more of the methodologies discussed herein.

The machine 500 includes processors 504, memory 506, and I/O components 508 configured to communicate with each other such as via a bus 510. In some examples, the processors 504 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, multiple processors as exemplified by processor 512 and a processor 514 that may execute the instructions 502. The term "processor" is intended to include multi-core processors that may comprise two or more independent processors (sometimes referred to as "cores") that may execute instructions 502 contemporaneously. Although FIG. 5 shows multiple processors 504, the machine 500 may include a single processor with a single core, a single processor with multiple cores (e.g., a multi-core processor), multiple processors with a single core, multiple processors with multiple cores, or any combination thereof.

The memory 506 may include a main memory 532, a static memory 516, and a storage unit 518 including a machine storage medium 534, all accessible to the processors 504 such as via the bus 510. The main memory 532, the static memory 516, and the storage unit 518 store the instructions 502 embodying any one or more of the methodologies or functions described herein. The instructions 502 may also reside, completely or partially, within the main memory 532, within the static memory 516, within the storage unit 518, within at least one of the processors 504 (e.g., within the processor's cache memory), or any suitable combination thereof, during execution thereof by the machine 500.

The input/output (I/O) components 508 include components to receive input, provide output, produce output, transmit information, exchange information, capture measurements, and so on. The specific I/O components 508 that are included in a particular machine 500 will depend on the type of machine. For example, portable machines such as mobile phones will likely include a touch input device or other such input mechanisms, while a headless server machine will likely not include such a touch input device. It will be appreciated that the I/O components 508 may include many other components that are not shown in FIG. 5. The I/O components 508 are grouped according to functionality merely for simplifying the following discussion and the grouping is in no way limiting. In various examples, the I/O components 508 may include output components 520 and input components 522. The output components 520 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 522 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 508 may include communication components 524 operable to couple the machine 500 to a network 536 or devices 526 via a coupling 530 and a coupling 528, respectively. For example, the communication components 524 may include a network interface component or another suitable device to interface with the network 536. In further examples, the communication components 524 may include wired communication components, wireless communication components, cellular communication components, and other communication components to provide communication via other modalities. The devices 526 may be another machine or any of a wide variety of peripheral devices (e.g., a peripheral device coupled via a universal serial bus (USB)). For example, as noted above, the machine 500 may correspond to any one of the compute service manager 104, the execution platform 110, and the devices 526 may include the data storage device 226 or any other computing device described herein as being in communication with the data platform 102 or the data storage 106.

The various memories (e.g., 506, 516, 532, and/or memory of the processor(s) 504 and/or the storage unit 518) may store one or more sets of instructions 502 and data structures (e.g., software) embodying or utilized by any one or more of the methodologies or functions described herein. These instructions 502, when executed by the processor(s) 504, cause various operations to implement the disclosed examples.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various examples, one or more portions of the network 536 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 536 or a portion of the network 536 may include a wireless or cellular network, and the coupling 530 may be a Code Division Multiple Access (CDMA) connection, a Global System for Mobile communications (GSM) connection, or another type of cellular or wireless coupling. In this example, the coupling 530 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, fifth generation wireless (5G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 502 may be transmitted or received over the network 536 using a transmission medium via a network interface device (e.g., a network interface component included in the communication components 524) and utilizing any one of a number of well-known transfer protocols (e.g., hypertext transfer protocol (HTTP)). Similarly, the instructions 502 may be transmitted or received using a transmission medium via the coupling 528 (e.g., a peer-to-peer coupling) to the devices 526. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 502 for execution by the machine 500, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methodologies disclosed herein may be performed by one or more processors. The performance of certain of the operations may be distributed among the one or more processors, not only residing within a single machine, but also deployed across a number of machines. In some examples, the processor or processors may be located in a single location (e.g., within a home environment, an office environment, or a server farm), while in other examples the processors may be distributed across a number of locations.

Although the examples of the present disclosure have been described with reference to specific examples, it will be evident that various modifications and changes may be made to these examples without departing from the broader scope of the inventive subject matter. Accordingly, the specification and drawings are to be regarded in an illustrative rather than a restrictive sense. The accompanying drawings that form a part hereof show, by way of illustration, and not of limitation, specific examples in which the subject matter may be practiced. The examples illustrated are described in sufficient detail to enable those skilled in the art to practice the teachings disclosed herein. Other examples may be used and derived therefrom, such that structural and logical substitutions and changes may be made without departing from the scope of this disclosure. This Detailed Description, therefore, is not to be taken in a limiting sense, and the scope of various examples is defined only by the appended claims, along with the full range of equivalents to which such claims are entitled.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

Such examples of the inventive subject matter may be referred to herein, individually and/or collectively, by the term "example" merely for convenience and without intending to voluntarily limit the scope of this application to any single invention or inventive concept if more than one is in fact disclosed. Thus, although specific examples have been illustrated and described herein, it should be appreciated that any arrangement calculated to achieve the same purpose may be substituted for the specific examples shown. This disclosure is intended to cover any and all adaptations or variations of various examples. Combinations of the above examples, and other examples not specifically described herein, will be apparent, to those of skill in the art, upon reviewing the above description.

What is claimed is:

1. A data platform comprising:
  one or more processors; and
  at least one memory storing instructions that cause the one or more processors to perform operations comprising:
  generating an exchange template based on compliance rules;
  determining to initiate generation of a compliance report; and
  in response to determining to initiate the generation of the compliance report, performing operations comprising:
  mapping evidence items for the compliance report from one or more source tables using a data field mapper of the exchange template;
  generating compliance program specific views based on the evidence items mapped from the one or more source tables;
  generating an anonymized view based on the compliance program specific views using an anonymization layer of the exchange template; and
  providing the anonymized view to an assessor using one or more validation scripts of the exchange template.

2. The data platform of claim 1, wherein determining to initiate the generation of the compliance report further comprises:
  receiving a request for the compliance report from the assessor; and
  determining to initiate generation of the compliance report in response to receiving the request for the compliance report from the assessor.

3. The data platform of claim 1, wherein determining to initiate generation of the compliance report further comprises:
  detecting an occurrence of a scheduled event of a predetermined schedule; and
  determining to initiate generation of the compliance report based on the occurrence of the scheduled event.

4. The data platform of claim 1, wherein mapping the evidence items further comprises:
  performing a logical mapping between the one or more source tables and abstracted views based on data fields relevant to a specified compliance program.

5. The data platform of claim 1, wherein generating the anonymized view further comprises:
  generating the anonymized view based on one or more anonymization rules applied to the compliance program specific views by the anonymization layer.

6. The data platform of claim 1, wherein providing the anonymized view to the assessor further comprises:
  storing the anonymized view in a shared database of the data platform.

7. The data platform of claim 1, wherein validation script is a pre-built script specific to the compliance program being assessed.

8. A computer-implemented method of a data platform, the method comprising:
  generating, by one or more processors of the data platform, an exchange template based on compliance rules;
  determining, by the one or more processors, to initiate generation of a compliance report; and
  in response to determining to initiate the generation of the compliance report, performing operations comprising:
  mapping, by the one or more processors, evidence items for the compliance report from one or more source tables using a data field mapper of the exchange template;
  generating, by the one or more processors, compliance program specific views based on the evidence items mapped from the one or more source tables;
  generating, by the one or more processors, an anonymized view based on the compliance program specific views using an anonymization layer of the exchange template; and
  providing, by the one or more processors, the anonymized view to an assessor using one or more validation scripts of the exchange template.

9. The computer-implemented method of claim 8, wherein determining to initiate generation of the compliance report further comprises:
  receiving a request for the compliance report from the assessor; and
  determining to initiate generation of the compliance report in response to receiving the request for the compliance report from the assessor.

10. The computer-implemented method of claim 8, wherein determining to initiate generation of the compliance report further comprises:
  detecting an occurrence of a scheduled event of a predetermined schedule; and
  initiating generation of the compliance report based on the occurrence of the scheduled event.

11. The computer-implemented method of claim 8, wherein mapping the evidence items further comprises:
  performing a logical mapping between the one or more source tables and abstracted views based on data fields relevant to a specified compliance program.

12. The computer-implemented method of claim 8, wherein generating the anonymized view further comprises:
  generating the anonymized view based on one or more anonymization rules applied to the compliance program specific views by the anonymization layer.

13. The computer-implemented method of claim 8, wherein providing the anonymized view to the assessor further comprises:
  storing the anonymized view in a shared database of the data platform.

14. The computer-implemented method of claim 8, wherein validation script is a pre-built script specific to the compliance program being assessed.

15. A non-transitory computer-storage medium comprising instructions that, when executed by one or more processors of a data platform, configure the data platform to perform operations comprising:
 generating an exchange template based on compliance rules;
 determining to initiate generation of a compliance report; and
 in response to determining to initiate the generation of the compliance report, performing operations comprising:
 mapping evidence items from one or more source tables for the compliance report using a data field mapper of the exchange template;
 generating compliance program specific views based on the evidence items mapped from the one or more source tables;
 generating an anonymized view based on the compliance program specific views using an anonymization layer of the exchange template; and
 providing the anonymized view to an assessor using one or more validation scripts of the exchange template.

16. The non-transitory computer-storage medium of claim 15, wherein determining to initiate generation of the compliance report further comprises:
 receiving a request for the compliance report from the assessor; and
 determining to initiate generation of the compliance report in response to receiving the request for the compliance report from the assessor.

17. The non-transitory computer-storage medium of claim 15, wherein determining to initiate generation of the compliance report further comprises:
 detecting an occurrence of a scheduled event of a predetermined schedule; and
 determining to initiate generation of the compliance report based on the occurrence of the scheduled event.

18. The non-transitory computer-storage medium of claim 15, wherein mapping the evidence items further comprises:
 performing a logical mapping between the one or more source tables and abstracted views based on data fields relevant to a specified compliance program.

19. The non-transitory computer-storage medium of claim 15, wherein generating the anonymized view further comprises:
 generating the anonymized view based on one or more anonymization rules applied to the compliance program specific views by the anonymization layer.

20. The non-transitory computer-storage medium of claim 15, wherein providing the anonymized view to the assessor further comprises:
 storing the anonymized view in a shared database of the data platform.

* * * * *